(12) United States Patent
Hemige

(10) Patent No.: US 8,976,788 B2
(45) Date of Patent: *Mar. 10, 2015

(54) DATA PLANE INDEPENDENT ASSERT ELECTION

(71) Applicant: Alcatel Lucent, Paris (FR)

(72) Inventor: Venugopal V. Hemige, Union City, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 177 days.

This patent is subject to a terminal disclaimer.

(21) Appl. No.: 13/666,596

(22) Filed: Nov. 1, 2012

(65) Prior Publication Data

US 2013/0121336 A1 May 16, 2013

Related U.S. Application Data

(63) Continuation of application No. 11/496,995, filed on Jul. 31, 2006, now Pat. No. 8,345,683.

(51) Int. Cl.
*H04L 12/28* (2006.01)
*H04L 12/761* (2013.01)

(52) U.S. Cl.
CPC .................................... *H04L 45/16* (2013.01)
USPC ........................... 370/390; 370/254; 370/256

(58) Field of Classification Search
USPC ................................. 370/254, 256, 390, 389
See application file for complete search history.

(56) References Cited

U.S. PATENT DOCUMENTS

| 7,839,850 | B2* | 11/2010 | Kompella | ...................... 370/390 |
| 2004/0205215 | A1* | 10/2004 | Kouvelas et al. | ............. 709/231 |
| 2007/0189193 | A1* | 8/2007 | Previdi et al. | ................. 370/256 |

OTHER PUBLICATIONS

Protocol Independent multicast sparse mode (PM-SM) protocol specification, by Estin, Jun. 1998.*
"Multicast Techniques in mobile ad hoc network" by Chen, 2003.*

* cited by examiner

*Primary Examiner* — Dang Ton
*Assistant Examiner* — Pamit Kaur
(74) *Attorney, Agent, or Firm* — VanPelt, Yi & James, LLP

(57) ABSTRACT

Avoiding duplicative forwarding of multicast traffic is disclosed. A join message received at a first router is directed to a peer router of the first router from a first downstream node of the first router and the peer router without passing through the peer router. The join message indicates that one or more downstream nodes of the peer desire to receive from the peer multicast traffic specified in the join message. It is determined whether the join message from the first downstream node to the peer would result in duplicative forwarding by the peer of multicast traffic from an upstream source upstream of the peer and the first router based on the join message. Based at least in part on a determination that the join message would result in duplicative forwarding of the multicast traffic, an election procedure is initiated to avoid such duplicative forwarding of the multicast traffic.

20 Claims, 5 Drawing Sheets

DATA PLANE INDEPENDENT ASSERT ELECTION

CROSS REFERENCE TO OTHER APPLICATIONS

This application is a continuation of co-pending U.S. patent application Ser. No. 11/496,995, entitled DATA PLANE INDEPENDENT ASSERT ELECTION filed Jul. 31, 2006 which is incorporated herein by reference for all purposes.

BACKGROUND OF THE INVENTION

Multicast routing protocols, such as the Protocol Independent Multicast-Sparse Mode (PIM-SM) protocol, are used to distribute multicast traffic efficiently. PIM-SM is designed to route multicast packets to widely distributed and sparsely populated multicast groups efficiently via transmission paths that include Ethernet-based segments such as local area networks (LANs), wide area networks (WANs), and RFC 2547 and/or other virtual private networks and similar services that provide LAN or LAN-like connectivity across provider or other networks. Routers that desire to receive multicast traffic associated with a multicast group subscribe to the group. In PIM-SM, a router that receives a request to subscribe to a multicast group sends to an upstream router nearer the source a "join" message, to let the upstream router know that the downstream router needs to receive multicast traffic associated with the group. The join message is sent as a link-local multicast packet but the message specifies an upstream neighbor to which the request is directed. Per the PIM-SM protocol specification, only the router specified in the join request processes the request. If other routers wishing to join the same multicast group also have chosen the same upstream neighbor for that group, then such routers suppress their own joins upon seeing a Join on the LAN. On the other hand, if a router wishing to join the same multicast group has chosen a different upstream neighbor for that group, then such a router will have to send a join request explicitly on the LAN.

To avoid the inefficiency of multiple routers forwarding the same multicast traffic on the same LAN or similar segment, PIM-SM and similar protocols provide for routers that detect when duplicate traffic is being sent and perform an "assert" election to determine which of them will forward the multicast traffic via the LAN. Existing mechanisms for detecting that an assert election should be performed require that the PIM-SM router detect that multicast traffic for a group is being received on an interface via which the router is forwarding multicast traffic for the group, i.e., the multicast traffic is received on what the router considers to be an outbound interface for the group. This typically requires either special logic and/or circuitry at the interface or more commonly that multicast traffic received at a LAN or similar interface (part of the data traffic "forwarding plane") be sent to the control plane for a determination to be made, e.g., by a control processor, as to whether the traffic comprises multicast traffic that is being received on an outbound interface for the multicast group with which the traffic is associated. This interaction between the forwarding plane and control plane consumes control plane resources, can lead to delay, and results in at least some duplicate forwarding of multicast traffic until the condition can be detected and an assert election initiated and completed. Therefore, there is a need for a better way to process multicast traffic.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Initiating an assert election in response to a join message to a peer is disclosed. A join message directed to a peer is received. It is determined whether the join message relates to a multicast group with respect to which an assert election would be triggered if the peer to which the join is directed were to accept and process the join and subsequently forward in the direction of a sender of the join multicast traffic associated with the group. If so, an assert election is initiated in response to the received join message directed to the peer, without waiting for duplicate multicast traffic to be noticed on the outbound interface.

Figure 1:
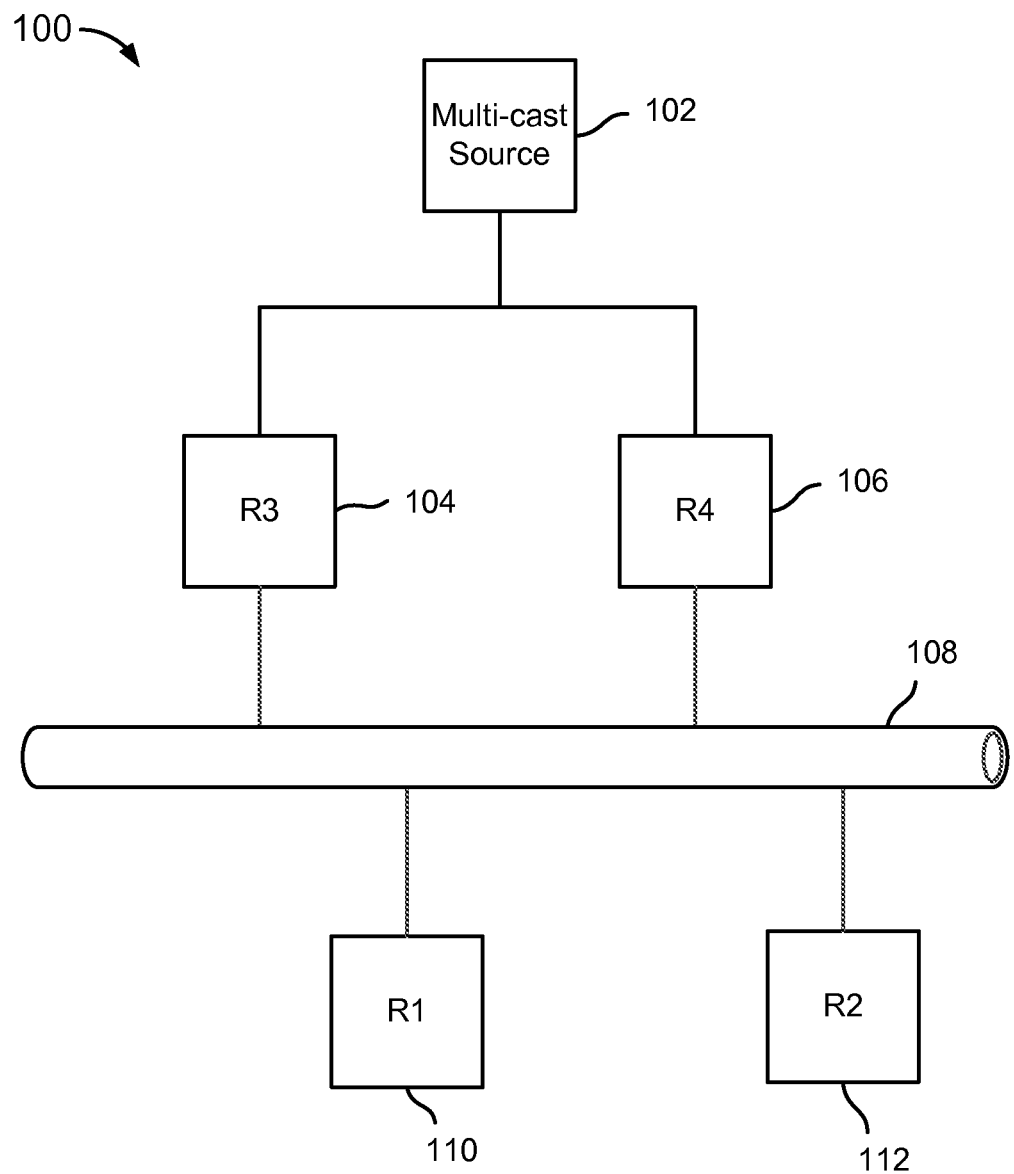
FIG. 1 is a block diagram illustrating an embodiment of a network through which multicast traffic may be distributed.

FIG. 1 is a block diagram illustrating an embodiment of a network through which multicast traffic may be distributed. In the example shown, network 100 includes a multicast source 102. In various embodiments, multicast source 102 comprises one or more of the following: a source of multicast traffic, a PIM-SM rendezvous point (RP), and an upstream PIM-SIM or other multicast protocol router common to routers 104 and 106. Routers R1, R2, R3, and R4, also labeled 110, 112, 104, and 106, respectively, comprise PIM-SM routers configured to forward multicast traffic to downstream nodes, e.g., other routers and/or end consumers of the multicast traffic. In the example shown in FIG. 1, assume router R1 has received an indication that one or more downstream nodes desire to receive from router R1 multicast traffic for a group with which source 102 is associated and R2 likewise has received an indication that one or more downstream nodes desire to receive from router R2 multicast traffic for the same group. Under the PIM-SM protocol, each of routers R1 and R2 would send, independently of one another, a join message to an upstream neighbor identified by the router (R1 or R2, as applicable), e.g., based on routing table information, as the best or otherwise selected node from which multicast traffic associated with the group should be obtained. Suppose, for example, that router R1 sent a join to router R3 and router R2 subsequently (or previously or at the same time) sent a join to router R4. Under PIM-SM, each respective join would be sent via LAN 108 to a multicast address, so that each of routers R3 and R4 would "see" each of the two join messages, but only R3 would process the join request from R1 and only R4 would process the join request from R2, based on information included in the join message by the sending router indicating which upstream router should process the join. In the example shown, R3 would arrange to receive from source 102 any multicast traffic for the group identified in the join (if necessary, i.e., if it has not already done so to be able to forward multicast traffic associated with the group to one or more other downstream nodes, other than R1, e.g., in response to previously received join requests received from such other nodes) and would configure itself to forward to router R1, via an outbound interface to router R1 via LAN 108, any multicast traffic for the group received from source 102. R4 likewise would arrange (if necessary) to receive multicast traffic for the group from source 102, and would configure itself to forward such traffic to router R2 via LAN 108.

In the above example, if source 102 were to begin sending multicast traffic associated with the group identified in the above-described join messages from routers R1 and R2, both router R3 and router R4 would forward the multicast traffic onto LAN 108. Router R3 would receive via LAN 108 the multicast traffic as forwarded onto LAN 108 by router R4 and router R4 likewise would receive via LAN 108 the multicast traffic as forwarded onto LAN 108 by router R3. As noted above, under the PIM-SM protocol, each of routers R3 and R4 typically would be configured to detect such duplicative forwarding of multicast traffic by determining that multicast traffic is being received by the router on an interface that is an outbound interface for that router with respect to a group with which the multicast traffic is associated, i.e., the router is itself configured to forward the very same multicast traffic via the interface on which it received the traffic. However, as noted above, typically the forwarding plane components (e.g., input/output modules and/or switching elements) are not configured and/or optimized to make such evaluations. Instead, typically at least a portion (e.g., a rate or otherwise limited sample) of received multicast traffic is sent to the control plane to determine whether it constitutes multicast traffic received on an outbound interface. This approach consumes control plane resources, which typically are not equipped to process high volumes of data traffic, and tolerates (even requires) duplicative forwarding of multicast traffic during the detection and assert election periods.

Figure 2:
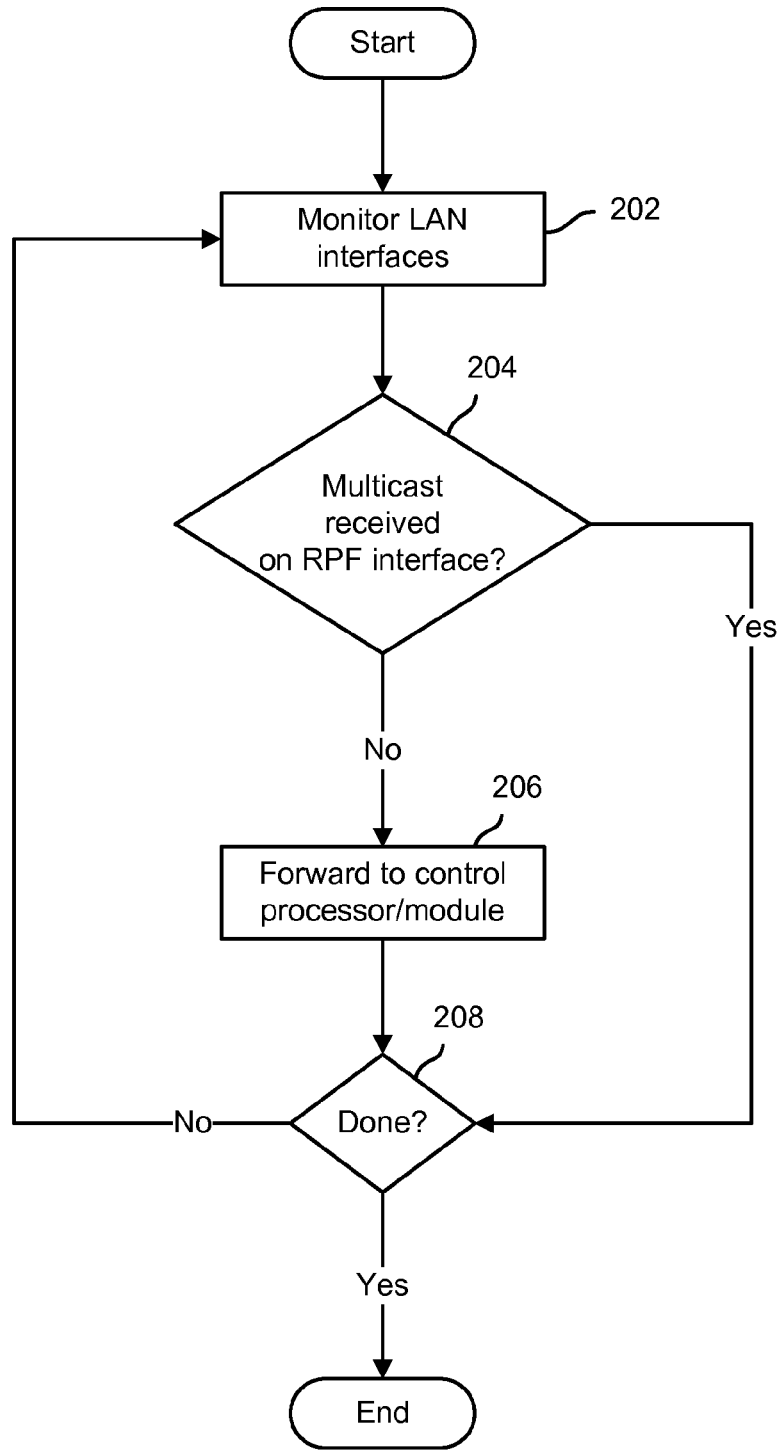
FIG. 2 is a flow chart illustrating an embodiment of a typical prior art process for routing received multicast traffic to a control plane and/or module.

FIG. 2 is a flow chart illustrating an embodiment of a typical prior art process for routing received multicast traffic to a control plane and/or module. In some typical prior art approaches, the process of FIG. 2 would be implemented on a PIM-SM router, such as router R3 and/or router R4 of FIG. 1. In the example shown, LAN interfaces are monitored (202). If a multicast packet is received on the upstream (RPF) interface, then such a packet is forwarded to all downstream interfaces. Otherwise (204), the packet is forwarded to a control processor and/or module (206). The control processor determines assert election (see FIG. 3 and accompanying text below). Even after the assert election, the monitoring continues and packets continue to be forwarded to the control processor (202) as long as the multicast stream is active (208). In some approaches, 206 includes additional logic, such as rate limiting, to limit the volume of traffic sent to the control plane for evaluation.

Figure 3:
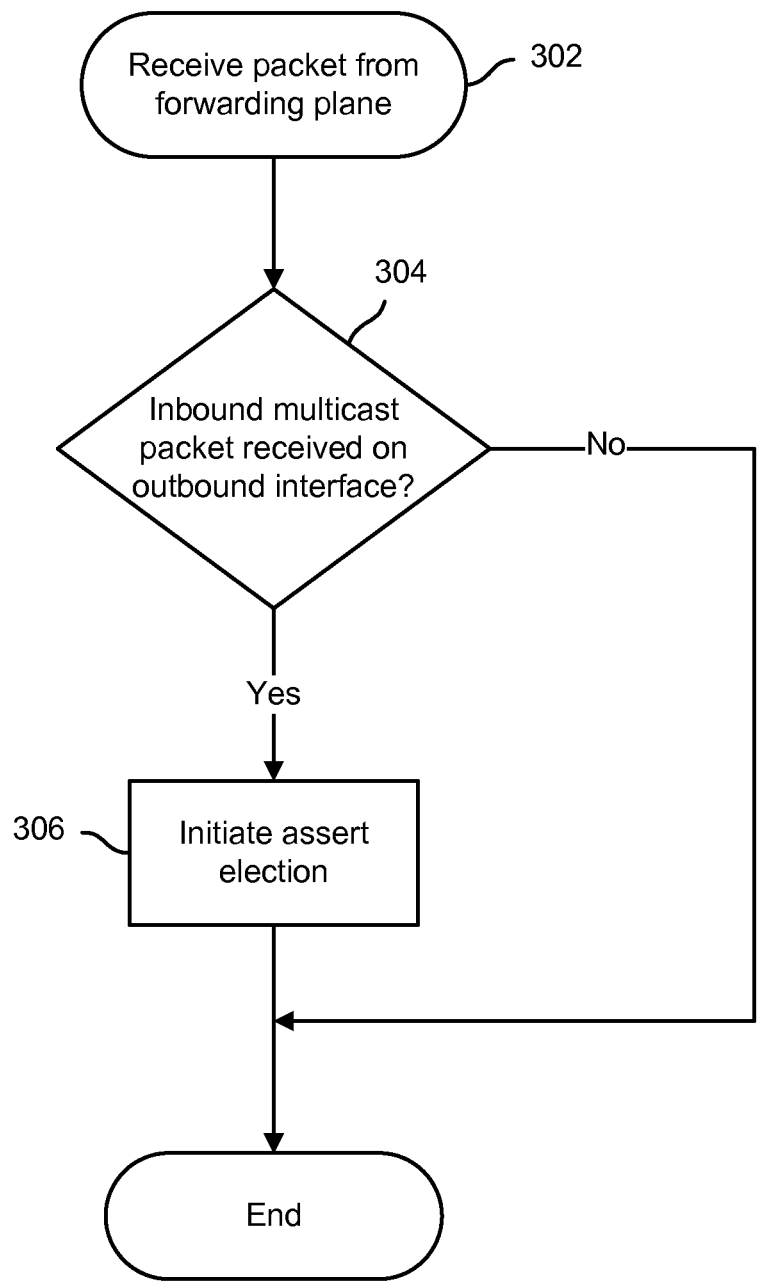
FIG. 3 is a flow chart illustrating an embodiment of a typical prior art process for determining whether multicast traffic has been received on an outbound interface.

FIG. 3 is a flow chart illustrating an embodiment of a typical prior art process for determining whether multicast traffic has been received on an outbound interface. In some typical prior art approaches, the process of FIG. 3 would be implemented on a control processor or module. A multicast packet is received from the forwarding plane (302). It is determined whether the packet was received on an interface that is for the receiving router an outbound interface for a multicast group with which the packet is associated (304). If so, an assert election is initiated (306). Otherwise, the process of FIG. 3 ends.

The details of a PIM-SM assert election are set forth in the PIM-SM protocol specification and are beyond the scope of this disclosure.

Initiating an assert election other than based on receipt of multicast traffic on an interface that is for the receiving router an outbound interface with respect to a multicast group with which the traffic is associated is disclosed.

Figure 4:
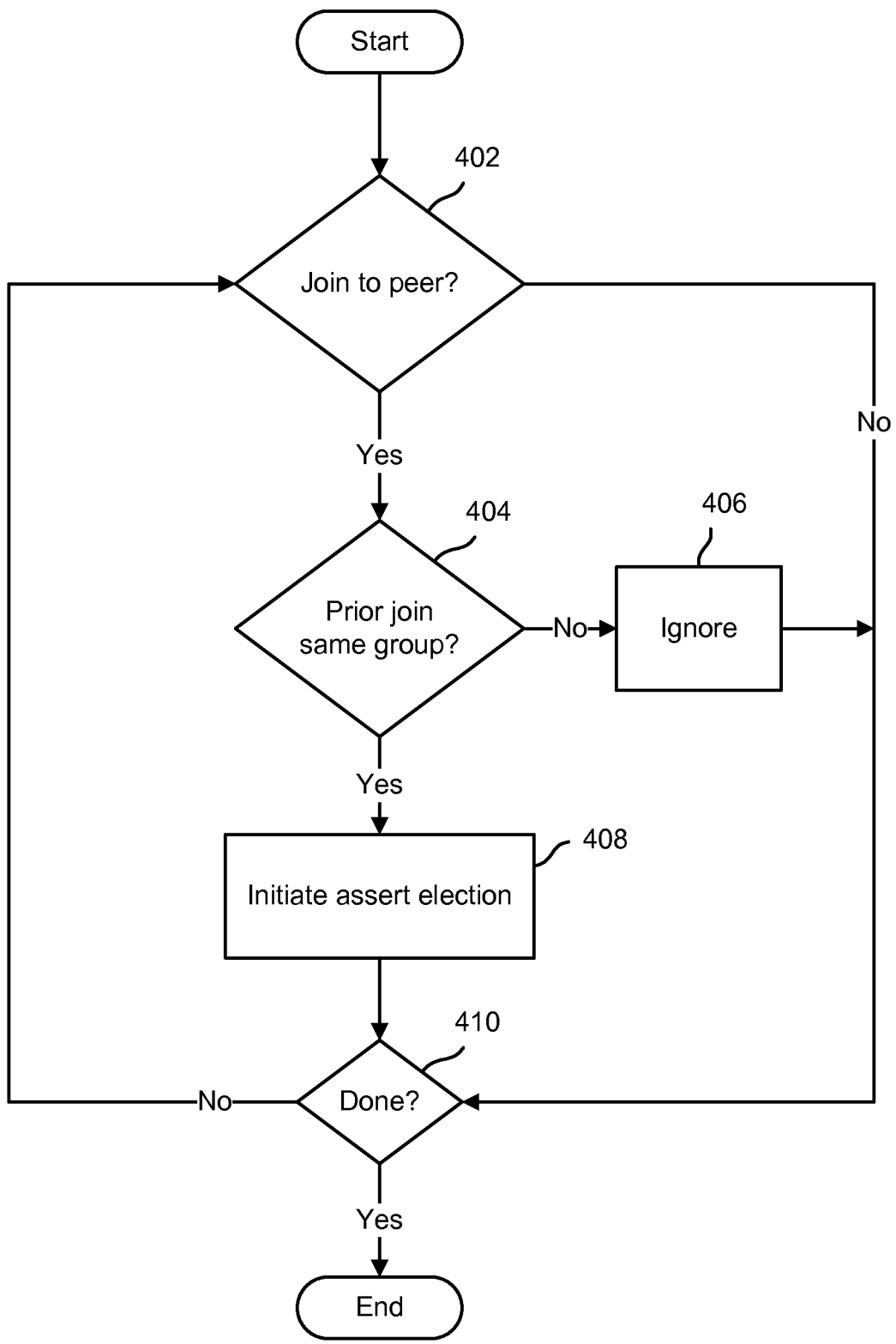
FIG. 4 is a flow chart illustrating an embodiment of a process for triggering a PIM-SM or similar assert election.

FIG. 4 is a flow chart illustrating an embodiment of a process for triggering a PIM-SM or similar assert election. In some embodiments, the process of FIG. 4 is implemented on a PIM-SM router, such as router R3 and/or router R4 of FIG. 1. If a PIM-SM or other "join" message directed to a peer router is received (402), it is determined whether the join message relates to a multicast group (or set of groups, source, etc.) with respect to which the router on which the process of FIG. 4 is being executed received and processed a prior "join" message directed to it (404). If the router that observed the join message to a peer has not previously received and processed a join message for the same group, such that if the router had received multicast traffic on an outbound interface for the group an assert election would be triggered under the PIM-SM protocol, the router ignores the join message (406) and monitoring for join messages to peers continues until done (410). If the router has received and processed a join message for the same group, as determined for example by checking a multicast routing table or other data store for entries relating to the group, an assert election is initiated (408), after which monitoring for join messages to peers continues until done (410).

In the approach illustrated by FIG. 4 and disclosed herein, an assert election is triggered and likely would be resolved prior to any multicast traffic being sent, thereby avoiding or at least minimizing duplicative forwarding of multicast traffic. In addition, PIM-SM routers would not be required to be configured to forward data traffic to the control plane, and the control plane would not be burdened with processing data traffic to detect receipt of multicast traffic on an outbound interface. Note that in the prior art approach even once an assert election has been resolved the router that is not elected, and indeed other PIM-SM routers on the LAN that were never part of the election, would continue to receive and be required to forward to and process at the control plane multicast traffic associated with the group. Using the approach described herein, data traffic would not be required to be forwarded to or processed by the control plane, and duplicative forwarding of multicast traffic, and concomitant congestion of the LAN, are avoided.

Figure 5:
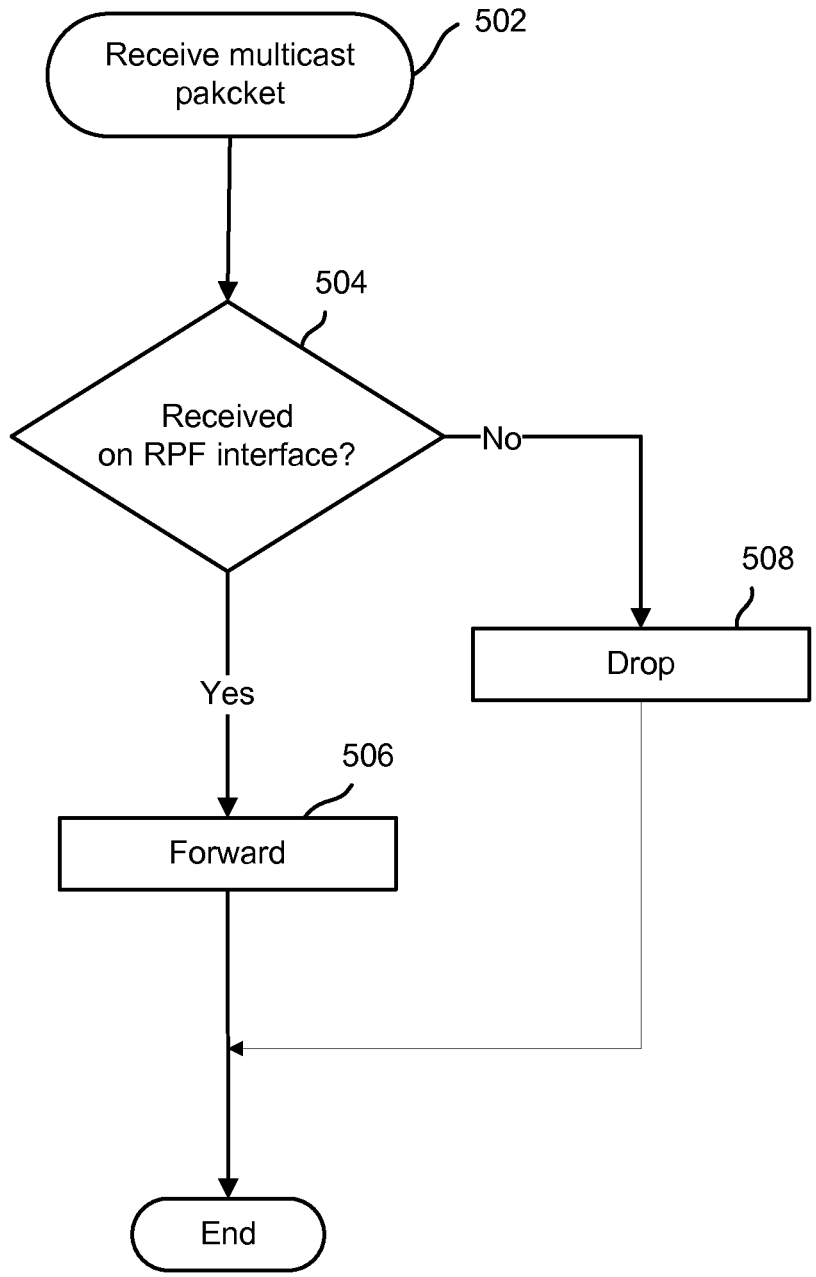
FIG. 5 is a flow chart illustrating an embodiment of a process for processing received multicast packets.

FIG. 5 is a flow chart illustrating an embodiment of a process for processing received multicast packets. FIG. 5 reflect the processing that occurs in the forwarding plane in some embodiments in which the process of FIG. 4 is used to avoid duplicative forwarding of multicast packets. When a multicast packet is received (502), it is determined whether the packet was received on an RPF interface (504). If so, the packet is forwarded to all downstream interfaces (506); if not, the packet is dropped (508).

In PIM-SM, multicast traffic can be forwarded due to received PIM join messages or due to received IGMP report messages. PIM join messages can be of the following types: Join(S,G), Join(*,G) and Join(*,*,RP). IGMP reports can be of the following types: (S,G) or (*,G). Join(S,G) implies that the router wishes to receive traffic forwarded by source S to group G. Join(*,G) implies that the router wishes to receive traffic forwarded by any source to group G. Join(*,*,RP) implies that the router wishes to receive all traffic forwarded by the rendezvous point RP.

Different downstream routers could be sending any of the different PIM join messages or IGMP report messages that can result in duplicate traffic to be forwarded for the same flow. The solution presented here can be applied to any of these combinations of joins and report messages to trigger assert election.

The approaches disclosed herein are described in detail in connection with the PIM-SM protocol, but they apply as well to other protocols that depend on the detection of duplicative forwarding of multicast traffic to trigger an "assert" or equivalent election.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for avoiding duplicative forwarding of multicast traffic, comprising:
   a communication interface; and
   a processor configured to:
      receive via the communication interface at a first router a join message directed to a peer router of the first router from a first downstream node of the first router and the peer router without passing through the peer router, wherein the join message indicates that one or more downstream nodes of the peer desire to receive from the peer multicast traffic specified in the join message;
      determine whether the join message from the first downstream node to the peer would result in duplicative forwarding by the peer of multicast traffic from an upstream source upstream of the peer and the first router based on the join message; and
      initiate, based at least in part on a determination that the join message would result in duplicative forwarding of multicast traffic, an election procedure to avoid such duplicative forwarding of multicast traffic;
      wherein determining whether the join message to the peer would result in duplicative forwarding of multicast traffic comprises determining whether the join message would result in two or more routers being configured to forward the same multicast traffic onto a same network segment before the two or more routers are configured to forward the same multicast traffic onto the same network segment.

2. The system as recited in claim 1, wherein the communication interface and the processor comprise a router.

3. The system as recited in claim 1, wherein the processor is configured to determine whether the join message to the peer would result in duplicative forwarding of the multicast traffic at least in part by determining whether a routing entry associated with a multicast group with which the join message is associated exists.

4. The system as recited in claim 1, wherein the processor is configured to initiate the election procedure at least in part by sending an assert message to the peer.

5. The system as recited in claim 1, wherein the network segment comprises one or more of the following: a local area network (LAN), a wide area network (WAN), an RFC 2547 based network, and a virtual private network.

6. The system as recited in claim 1, wherein the join message comprises a PIM-SM join message.

7. The system as recited in claim 1, wherein the election procedure comprises a PIM-SM assert election.

8. The system as recited in claim 1, wherein the election procedure is initiated with respect to the peer.

9. A method for avoiding duplicative forwarding of multicast traffic, comprising:
   receiving at a first router a join message directed to a peer router of the first router from a first downstream node of the first router and the peer router without passing through the peer router, wherein the join message indicates that one or more downstream nodes of the peer desire to receive from the peer multicast traffic specified in the join message;
   determining whether the join message from the first downstream node to the peer would result in duplicative forwarding by the peer of multicast traffic from an upstream source upstream of the peer and the first router based on the join message; and
   initiating, based at least in part on a determination that the join message would result in duplicative forwarding of the multicast traffic, an election procedure to avoid such duplicative forwarding of the multicast traffic;
   wherein determining whether the join message to the peer would result in duplicative forwarding of the multicast traffic comprises determining whether the join message would result in two or more routers being configured to forward the same multicast traffic onto a same network segment before the two or more routers are configured to forward the same multicast traffic onto the same network segment.

10. The method as recited in claim 9, wherein determining whether the join message to the peer would result in duplicative forwarding of the multicast traffic includes determining whether a routing entry associated with a multicast group with which the join message is associated exists.

11. The method as recited in claim 9, wherein the network segment comprises one or more of the following: a local area network (LAN), a wide area network (WAN), an RFC 2547 based network, and a virtual private network.

12. The method as recited in claim 9, wherein the join message comprises a PIM-SM join message.

13. The method as recited in claim 9, wherein the election procedure comprises a PIM-SM assert election.

14. The method as recited in claim 9, wherein determining whether the join message to the peer would result in duplicative forwarding of the multicast traffic comprises determining whether a routing entry associated with a multicast group with which the join message is associated exists.

15. The method as recited in claim 9, wherein the election procedure is initiated with respect to the peer.

16. The method as recited in claim 9, wherein initiating an election procedure comprises sending an assert message to the peer.

17. A computer program product for avoiding duplicative forwarding of multicast traffic, the computer program product being embodied in a non-transitory tangible computer readable medium and comprising computer instructions for:
   receiving at a first router a join message directed to a peer router of the first router from a first downstream node of the first router and the peer router without passing through the peer router, wherein the join message indicates that one or more downstream nodes of the peer desire to receive from the peer multicast traffic specified in the join message;
   determining whether the join message from the first downstream node to the peer would result in duplicative forwarding by the peer of multicast traffic from an upstream source upstream of the peer and the first router based on the join message; and
   initiating based at least in part on a determination that the join message would result in duplicative forwarding of the multicast traffic an election procedure to avoid such duplicative forwarding of the multicast traffic;
   wherein determining whether the join message to the peer would result in duplicative forwarding of the multicast traffic comprises determining whether the join message would result in two or more routers being configured to forward the same multicast traffic onto a same network segment before the two or more routers are configured to forward the same multicast traffic onto the same network segment.

18. The computer program product as recited in claim 17, wherein determining whether the join message to the peer would result in duplicative forwarding of the multicast traffic includes determining whether a routing entry associated with a multicast group with which the join message is associated exists.

19. The computer program product as recited in claim 17, wherein the network segment comprises one or more of the following: a local area network (LAN), a wide area network (WAN), an RFC 2547 based network, and a virtual private network.

20. The computer program product as recited in claim 17, wherein determining whether the join message to the peer would result in duplicative forwarding of the multicast traffic comprises determining whether a routing entry associated with a multicast group with which the join message is associated exists.

* * * * *